(12) United States Patent
Capar (10) Patent No.: US 10,842,167 B2
(45) Date of Patent: Nov. 24, 2020

(54) CUTTER HAVING VARIED CAVITY DRAFT ANGLE

(71) Applicant: MARS, INCORPORATED, McLean, VA (US)

(72) Inventor: Paul Capar, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 566 days.

(21) Appl. No.: 14/772,309

(22) PCT Filed: Mar. 14, 2014

(86) PCT No.: PCT/US2014/027225
§ 371 (c)(1),
(2) Date: Sep. 2, 2015

(87) PCT Pub. No.: WO2014/152336
PCT Pub. Date: Sep. 25, 2014

(65) Prior Publication Data
US 2016/0007628 A1    Jan. 14, 2016

Related U.S. Application Data

(60) Provisional application No. 61/789,656, filed on Mar. 15, 2013.

(51) Int. Cl.
| | |
|---|---|
| *A23G 7/00* | (2006.01) |
| *A23P 30/10* | (2016.01) |
| *A23G 3/34* | (2006.01) |
| *B26F 1/38* | (2006.01) |
| *B26D 7/06* | (2006.01) |
| *B26D 7/08* | (2006.01) |

(52) U.S. Cl.
CPC ......... *A23G 7/0018* (2013.01); *A23G 3/0063* (2013.01); *A23G 7/0068* (2013.01); *A23P 30/10* (2016.08); *B26D 7/0625* (2013.01); *B26D 7/086* (2013.01); *B26F 1/38* (2013.01)

(58) Field of Classification Search
CPC ...... A23G 7/0018; A23G 7/68; B26D 7/0625; B26D 7/086; B26F 1/38
USPC .......................................................... 426/302
See application file for complete search history.

(56) References Cited

U.S. PATENT DOCUMENTS

| | | | |
|---|---|---|---|
| 140,824 A | 7/1873 | Hall et al. | |
| 641,725 A * | 1/1900 | Peters et al. | B29C 51/32 425/289 |
| 3,312,134 A | 4/1967 | Roney | |
| 3,312,314 A | 4/1967 | Peters | |
| 3,518,725 A | 7/1970 | Donofrio | |
| 4,369,200 A | 1/1983 | Iwao et al. | |
| 4,421,773 A | 12/1983 | Akutagawa | |
| 4,623,420 A | 11/1986 | Hinkley | |
| 4,711,693 A | 12/1987 | Holze | |
| 5,037,350 A | 8/1991 | Richardson et al. | |
| 5,382,149 A | 1/1995 | Yates et al. | |
| 5,861,185 A | 1/1999 | Capodieci | |
| 5,871,783 A | 2/1999 | Capodieci | |
| 5,934,043 A | 8/1999 | Aindow et al. | |
| 5,967,455 A * | 10/1999 | Farber | B65H 75/14 242/118.31 |
| 6,058,823 A | 5/2000 | Michoud | |
| 6,261,620 B1 | 7/2001 | Leadbeater | |
| 6,309,490 B1 | 10/2001 | Davis et al. | |
| 6,325,952 B1 | 12/2001 | Jarrett | |
| 6,481,318 B1 | 11/2002 | Kinigakis et al. | |
| 6,607,765 B2 | 8/2003 | Capodieci | |
| 6,635,292 B2 | 10/2003 | Capodieci | |
| 6,759,079 B2 | 7/2004 | Klug et al. | |
| 7,067,167 B2 | 6/2006 | Damsgard et al. | |
| 8,011,278 B1 | 9/2011 | Loper | |
| 2003/0082283 A1 | 5/2003 | Capodieci | |
| 2005/0132579 A1* | 6/2005 | Sartori | A21C 11/106 30/299 |
| 2006/0188622 A1 | 8/2006 | Suttle et al. | |
| 2007/0178205 A1 | 8/2007 | Kirksey | |
| 2008/0135556 A1* | 6/2008 | Bontrager | B65D 1/34 220/260 |
| 2008/0138472 A1 | 6/2008 | Alexandre | |

(Continued)

FOREIGN PATENT DOCUMENTS

| | | |
|---|---|---|
| CN | 1079105 | 12/1993 |
| CN | 200957614 | 10/2007 |

(Continued)

OTHER PUBLICATIONS

EP Search Report, Application No. 15153230.6, dated Jun. 5, 2015.

(Continued)

*Primary Examiner* — Jyoti Chawla (74) *Attorney, Agent, or Firm* — Fish & Richardson P.C.

(57) ABSTRACT

There is provided a cutter or mold having at least one sidewall defining a cavity, wherein the cavity draft angle varies. In some embodiments, the cutter may also include a base, i.e., the cutter can be a mold. The cutter or mold exhibits better release properties of food products molded or cut therewith than conventional cutters or molds having no cavity draft angle, or a uniform cavity draft angle. Rotary cutting wheels, that in some embodiments may be ultrasonically activated, as well as systems incorporating the cutters or molds are also provided, as are methods of forming food products using the cutters or molds.

11 Claims, 9 Drawing Sheets

(56) References Cited

U.S. PATENT DOCUMENTS

| | | | |
|---|---|---|---|
| 2011/0132729 | A1 | 6/2011 | Chisholm |
| 2015/0044338 | A1 | 2/2015 | Nagle et al. |

FOREIGN PATENT DOCUMENTS

| | | |
|---|---|---|
| EP | 2983871 | 4/2018 |
| JP | 2000343611 | 12/2000 |
| JP | 2008183667 | 8/2008 |
| JP | 4972226 | 7/2012 |
| RU | 1328197 | 8/1987 |
| RU | 2230655 C2 | 6/2004 |
| RU | 2009126585 | 4/2011 |
| TW | 1273014 | 5/2007 |
| WO | 2009151508 | 12/2009 |
| WO | 2011130024 | 10/2011 |
| WO | 2013148322 | 10/2013 |
| WO | 2014152336 | 9/2014 |

OTHER PUBLICATIONS

ISA/EP, Notification of Transmittal of the International Search Report and Written Opinion of the International Searching Authority, or the Declaration, PCT/US2013/032148, dated Jul. 11, 2013.

Vaitekunas, et al., "Effects of Frequency on the Cutting Ability of an Ultrasonic Surgical Instrument", Submitted to the 31st Annual Ultrasonic Industry Association Symposium, Oct. 11 and 12, 2001, Atlanta, GA.

AU Examination Report No. 1 for App No. AU2014239881, dated Mar. 10, 2017 (4 pages).

CN First Office Action for App No. CN201480013847.1, dated Sep. 8, 2016 (English Translation) (9 pages).

CN Search Report for App No. CN201480013847.1, dated Sep. 7, 2016 (English Translation) (2 pages).

CN Second Office Action for App No. CN201480013847.1, dated Jun. 28, 2017 (English Translation) (5 pages).

CN Third Office Action for App No. CN201480013847.1, dated Jan. 22, 2018 (English Translation) (6 pages).

EP Communication for App No. EP 14724561.7, dated Feb. 2, 2017 (4 pages).

EP Communication for App No. EP 14724561.7, dated Sep. 7, 2016 (4 pages).

International Preliminary Report on Patentability and Written Opinion for Int App No. PCT/US2014/027225 dated Sep. 15, 2015 (7 pages).

International Search Report for Int App No. PCT/US2014/027225 dated Sep. 9, 2014 (4 pages).

* cited by examiner

CUTTER HAVING VARIED CAVITY DRAFT ANGLE

This application is a 371 National Stage filing of International Application Serial No. PCT/US2014/027225 filed Mar. 14, 2014, which claims priority benefit of U.S. Provisional Patent Application Ser. No. 61/789,656 filed Mar. 15, 2013, all of which are hereby incorporated by reference in their entirety.

FIELD

Cutters, or molds, having a varied cavity draft angle are provided that have enhanced release properties as compared to cutters having a uniform cavity draft angle. Rotary cutting wheels incorporating the cutters or molds, and systems incorporating the rotary cutting wheels are also provided, as well as methods of forming food products using these.

BACKGROUND

Many food products are produced using cutting or molding techniques incorporating guillotine style cutters or rotary formers. In guillotine systems, the blades are generally straight, and so such systems may typically be limited to food products desirably having linear or angular shapes, such as rectangles or squares. Rotary formers are not so limited. In these systems, a number of cavities that can be of any shape are arranged in a complementary fashion on paired rotary forming wheels. Rotation of the rotary forming wheels causes the cavities to become positioned adjacent to each other forming an enclosed mold as described above. In both types of systems, the food product is desirably fed into the cutter and cut into the desired shape by the guillotine blade or rotary formers.

Both guillotine cutting and rotary forming can be suboptimal methods for forming food products that are sticky or semi-adhesive as delivered to the cutter or former. Typically, the sticky or semi-adhesive properties of the food product cause the food product to stick to the inside of the cavities, which causes the molded food product to resist falling out of the cavity by the force of gravity alone when the wheels separate. Consistency in the formed food product can also be difficult to achieve when the food product is sticky, especially when intricate or complicated shapes are desired.

Some attempts to alleviate or eliminate sticking of food products have involved the use of interconnective webbing formed between the food products during the cutting or molding process by excess food product. This interconnective webbing can act to pull food products from the guillotine cutter or cavities as the web of connected food products is conveyed therefrom. The application of ultrasonic energy has also been described for this purpose.

In the case of the former, the webbing represents excess material that is typically discarded as waste, adding to the cost of the process. And, ultrasonic energy, though fairly effective, can yet be a suboptimal solution in particular when applied to a cutter or former desirably used to form sticky food products, or multilayered products having at least one sticky layer.

More effective solutions for releasing food products from cutters or forming apparatus would thus be welcome in the art.

BRIEF DESCRIPTION

In one aspect, a cutter for a food product is provided. The cutter has at least one sidewall defining a cavity, the cavity comprising a varied cavity draft angle. The cutter can be a mold, i.e., may comprise a base defining a bottom of the cavity, and in some embodiments, the base may be contoured or patterned. The cavity draft angle may be from 0 to 10 degrees, and may desirably approach 0 at at least one point, or along a length, of the sidewall. In some embodiments, sidewall segments on opposite sides of an axis of symmetry have approximately the same cavity draft angle. In these, or other, embodiments, sidewall segments on opposite sides of an axis perpendicular to an axis of symmetry have approximately the same cavity draft angle. In some embodiments, sidewall segments on opposite sides of an axis of symmetry have a first cavity draft angle and sidewall segments on opposite sides of an axis perpendicular to an axis of symmetry have a second cavity draft angle and the first and second cavity draft angles are different.

The cutter or mold may have a substantially continuous sidewall, i.e., the sidewalls may have no areas of discontinuity. In other embodiments, the cavity of the cutter or mold is vented via the provision of discontinuities in the sidewall.

In another aspect, a rotary cutting wheel is provided. The rotary cutting wheel comprises one or more cutters, wherein at least one cutter comprises a sidewall defining a cavity and the cavity comprised a varied cavity draft angle. The cutter may further comprise a base defining a bottom of the cavity, and in some embodiments, this base may be a surface of the rotary wheel upon which the cutter is provided. At least one cutter on the rotary cutting wheel has a varied cavity draft angle, and in some embodiments, all cutters on the rotary cutting wheel have a varied cavity draft angle. The cutter(s) and/or wheel may be vented, and in embodiments where both are, the cutter cavity vent and the rotary cutting wheel vent may be connected. The wheel and/or cutter(s) may be ultrasonically activated.

In another aspect, a system for forming a food product is provided. The system comprises rotary cutting wheel comprising one or more cutters, at least one cutter having at least one sidewall defining a cavity, the cavity comprising a varied cavity draft angle. The system further comprises a conveying element that moves a food product in relation to the rotary wheel. In some embodiments, the system further comprises a movable backing plate disposed beneath the surface of the conveying element and beneath the approximate center of mass of the rotary cutting wheel whereby, as the rotary cutting wheel rotates, the one or more cutters of the rotary wheel contact the food product at the approximate location of the movable backing plate.

In yet another aspect, a method of forming a food product is provided. The method comprises forming one or more food product strips and then cutting the food product strips into a plurality of food product shapes by contacting the food product strips with a cutter having at least one sidewall defining a cavity, comprising a varied cavity draft angle. In some embodiments, the method further comprises forming the food product strips by forming a confectionery sheet and slitting the confectionery sheet into the one or more confectionary product strips. The method may also include further treatment of the food product shapes, e.g., as by applying a coating or confectionery layer, or other surface treatment, to said food product shapes after said cutting.

DETAILED DESCRIPTION

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.).

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Those of ordinary skill in the art are believed to be familiar with the phrase "cavity draft angle" and that phrase is not redefined herein, but rather has the meaning known in the art, i.e., "an angle incorporated into a wall of a mold so that the opening of the cavity is wider than its base". Although such angles are known to provide easier ejection of a part from a mold as compared to a mold wherein the cavity draft angle is zero, it has not heretofore been appreciated that varying the cavity draft angle within the same cavity could provide enhanced release properties, even as compared to the same cutter or mold wherein the cavity draft angle is uniform. Shape consistency can also be improved when using the present cutters and/or molds, as compared to conventional cutters/molds having a uniform cavity draft angle. Furthermore, when varying the cavity draft angle to improve release, the mold does not need to involve discontinuities in the sidewalls that create vent openings and thus does not present cleaning or clogging problems.

There is provided a cutter having a varied cavity draft angle. It has now been surprisingly discovered that cutters provided with the same may exhibit better release characteristics when cutting edible material than cutters having either no cavity draft angle, or, a uniform cavity draft angle. More particularly, it has been discovered that varying the cavity draft angle of the cutter, the food product being shaped and cut by the cutter will be directed towards side walls having a lower, i.e., closer to zero, cavity draft angle, where there is more room. The food product is thus not forced as tightly against those low cavity draft angle sidewalls as those with a larger cavity draft angle, and will adhere to the low cavity draft angle sidewalls less.

Thus, the side walls having a lower, i.e., closer to zero, cavity draft angle can be considered as serving as an enclosed vent to release the pressure of the food product mass as it is shaped by the cutter. By having an enclosed vent to release this pressure, there is no need to use open vents, placed about the exterior of the cutter or mold, to do so. Such vents have been used successfully in the past, but, for certain food products, and in particular, those that are sticky or include layers or sections of sticky material, can be suboptimal. This is because such food products can tend to stick within the vents, thereby clogging them over time, or otherwise presenting potential contamination or cleaning problems. By use of the varied cavity draft angle described herein, the use of such vents can be minimized, or even eliminated entirely, while yet providing the same or enhanced releasability of food products as that provided by a cutter or mold having a uniform cavity draft angle and/or sidewall vents.

The cavity draft angle may be varied in similar sections of the cutter or mold, i.e., may be varied in the same way across corresponding lengths on opposite sides of the cutter, or may be varied in a random manner. In some embodiments, sidewall segments on opposite sides of an axis of symmetry have approximately the same cavity draft angle. In these, or other, embodiments, sidewall segments on opposite sides of an axis perpendicular to an axis of symmetry have approximately the same cavity draft angle. In some embodiments, sidewall segments on opposite sides of an axis of symmetry have a first cavity draft angle and sidewall segments on opposite sides of an axis perpendicular to an axis of symmetry have a second cavity draft angle and the first and second cavity draft angles are different.

So long as the cavity draft angle is not uniform, it is believed that at least some benefit may be seen in the release properties of the cutter. In some embodiments, the lower cavity draft angle will be placed in a region of the cutter where the food mass would be forced due to the cutting and shaping action of the cutter. By placing the lower cavity draft angle in such a region, the food mass has a place to go and thus does not ooze out of the cutter which would detract from the shape being created by the cutter as well as create waste, etc.

Figure 1:
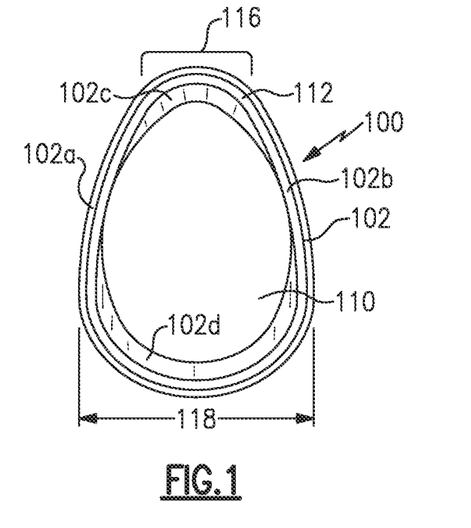
FIG. 1 is an illustration of a cutter according to one embodiment.
Figure 2:
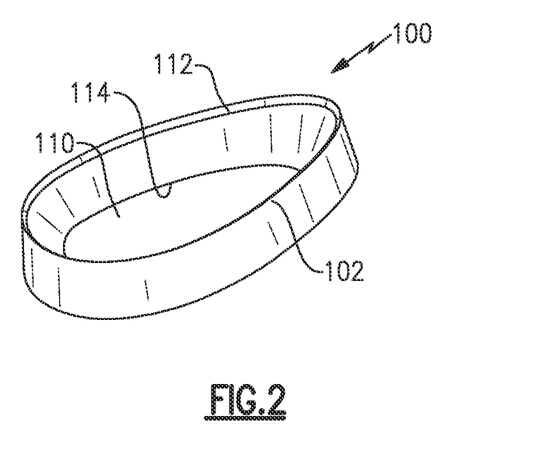
FIG. 2 is an illustration, in perspective view, of the cutter shown in FIG. 2.
Figure 3:
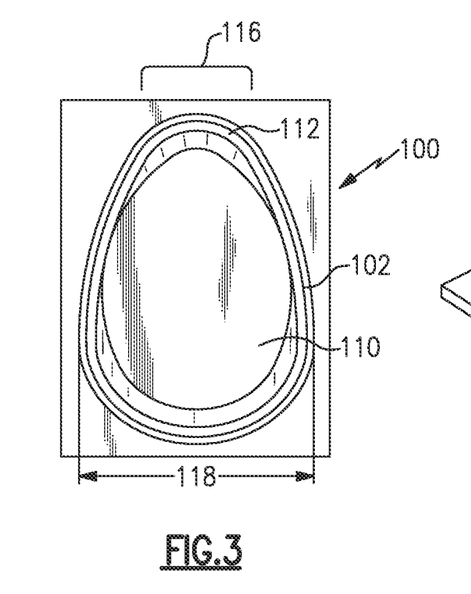
FIG. 3 is an illustration of the cutter shown in FIG. 1, provided with a base to as to provide a mold according to one embodiment.
Figure 4:
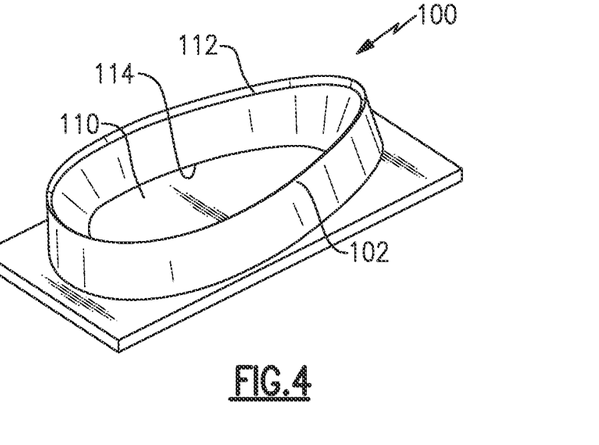
FIG. 4 is an illustration, in perspective view, of the mold shown in FIG. 3.

FIGS. 1-13 show various views of different embodiments of the cutter and molds provided herein. More specifically, FIGS. 1 and 2 show a cutter, while FIGS. 3 and 4 show a mold incorporating the cutter of FIGS. 1 and 2, and a base. Cutters and molds 100 have continuous sidewall 102 defining cavity 110 and are egg-shaped. As shown, the thickness of sidewall 102 increases from cutting edge 112 to base edge 114 across lengths 102c and 102d of sidewall 102. The cavity draft angle along these lengths of cavity 110 is greater than that provided by sidewall sections 102a and 102b wherein the thickness of the sidewall may be substantially the same from cutting edge 112 to base edge 114, so that the cavity draft angle along such lengths may approach 0.

In the embodiment shown in FIG. 1-4, the cavity draft angle along sidewall segments on opposite sides of the axis of symmetry is minimized, i.e., the cavity draft angle approaches 0 on left and right sidewall portions 102a and 102b. The cavity draft angle is maximized, i.e., is closer to 10, on sidewall portions 102c and 102d, on opposite sides of an axis perpendicular to an axis of symmetry.

Figure 5:
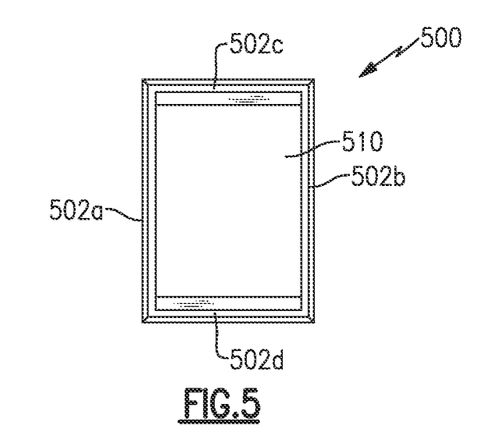
FIG. 5 is an illustration of a cutter according to one embodiment.
Figure 6:
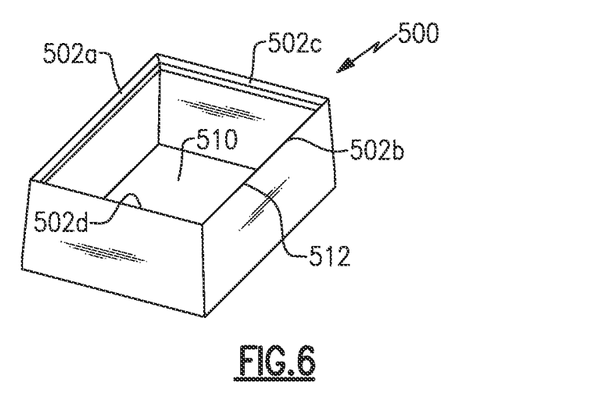
FIG. 6 is an illustration, in perspective view, of the cutter shown in FIG. 5.
Figure 7:
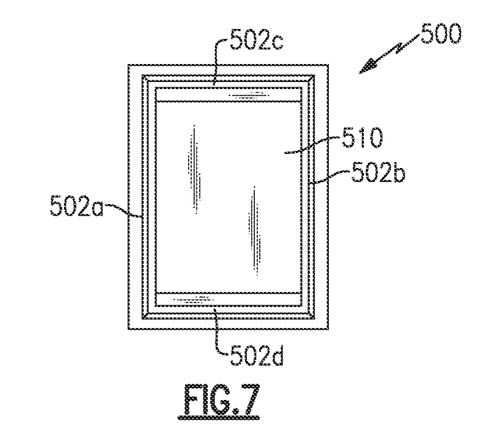
FIG. 7 is an illustration of the cutter shown in FIG. 5, provided with a base with a contoured surface so as to provide a mold according to one embodiment.
Figure 8:
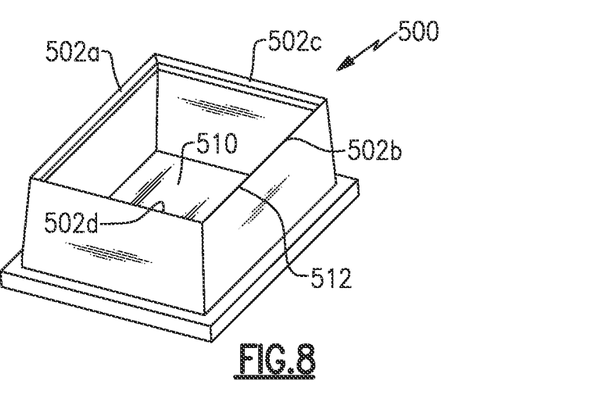
FIG. 8 is an illustration, in perspective view, of the mold shown in FIG. 7.
Figure 9:
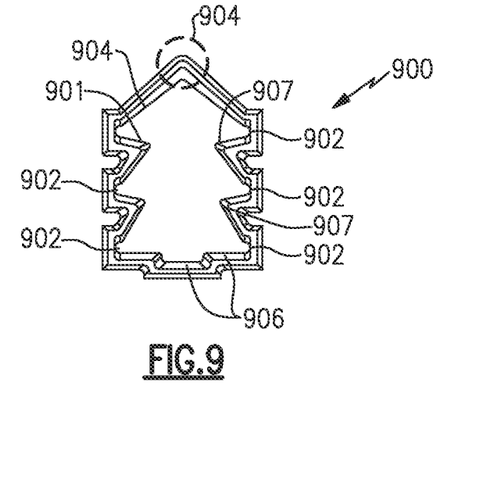
FIG. 9 is an illustration of a cutter according to one embodiment.
Figure 10:
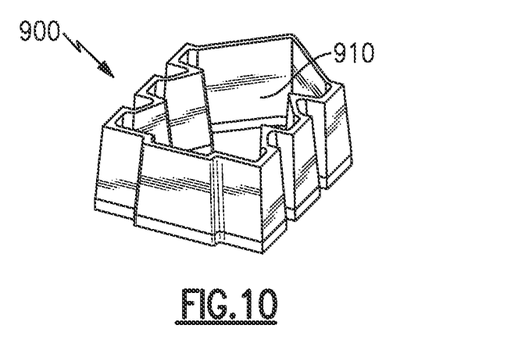
FIG. 10 is an illustration, in perspective view, of the cutter shown in FIG. 9.

FIGS. 5-8 show a cutter having a different shape, defined by 4 different segments of sidewalls, wherein the cavity draft angle provided by sidewall portions 502a and 502b is approximately the same and approaches 0. The cavity draft angle provided by sidewall segments 502c and 502d is also substantially the same, and may generally be from 1-10 degrees. The cutter shown in FIGS. 5 and 6 is provided with a base to provide the mold shown in FIGS. 7 and 8. In the case of FIG. 8, the base is contoured, and a food product cut or molded using the mold shown therein will have a generally rippled surface, imparted thereto by base 510.

In this embodiment, cutter 500 has two axis of symmetry and so, when arranged about the vertical axis of symmetry, sidewall portions 502a and 502b would be left and right, and 502c and 502d would be upper and lower, or top and bottom. If arranged about the second, horizontal axis of symmetry, sidewall portions 502c and 502d would be on the left and right, and 502a and 502b would be upper and lower, or top and bottom respectively. And so it can be seen that, depending on which axis cutter 500 is viewed, either the left and right or top and bottom sidewall portions would have similar cavity draft angles. However, it is to be understood that each segment 502a, 502b, 502c or 502d could have a different cavity draft angle, or all but one sidewall segment could have a cavity draft angle of zero, etc.

FIGS. 9-13 show yet another embodiment of a cutter or mold, as the case may be, having a cavity with a more complicated shape, defined by a plurality of sidewalls. As shown in FIGS. 9-13, sidewall segments 902 have a cavity draft angle of approximately 0, whereas the remaining sidewall segments provide varying cavity draft angles, i.e., from about 1 to about 10 degrees.

More specifically, sidewall segments 904 have a varying cavity draft angle along the combined length thereof, wherein the draft angle at either end thereof is smaller and the cavity draft angle increases toward the apex provided by the intersection of sidewall segments 904, where it is at its maximum. Sidewall segments 906 have the same draft angle, from 1-10 degrees, as do sidewall segments 907.

In the embodiment shown in FIG. 9-13, cutter 900 has one axis of symmetry, with sidewall segments 902 and 907 being on opposite sides thereof. When considered as an entire length, sidewall segments 904 and 906 are on opposite sides of an axis perpendicular to the axis of symmetry and can generally be considered to represent top and bottom portions of cutter 900. On the other hand, if considered as separate halves bisected by the axis of symmetry, the left side of sidewall segments 904 and 906 could be considered left segments and those to the right of the axis of symmetry could be considered to be right segments. The nomenclature for the individual segments is not critical, as a variance in cavity draft angle is believed to provide the enhanced release benefits and the benefit of more consistently forming the shape such as the fairly complicated shape shown in FIG. 9-13

Figure 11:
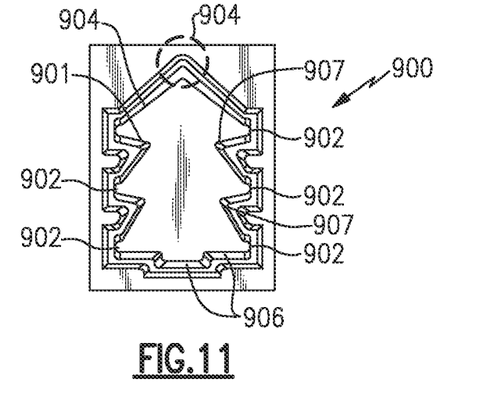
FIG. 11 is an illustration of the cutter shown in FIG. 9, provided with a base so as to provide a mold according to one embodiment.
Figure 12:
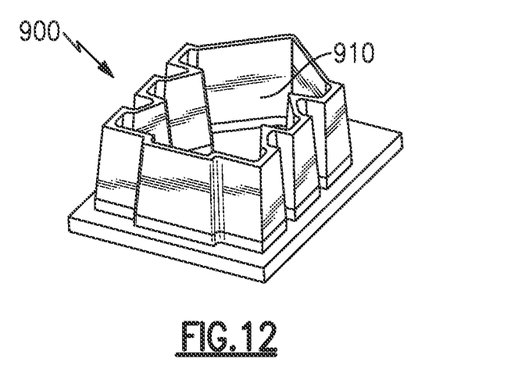
FIG. 12 is an illustration, in perspective view, of the mold shown in FIG. 11.
Figure 13:
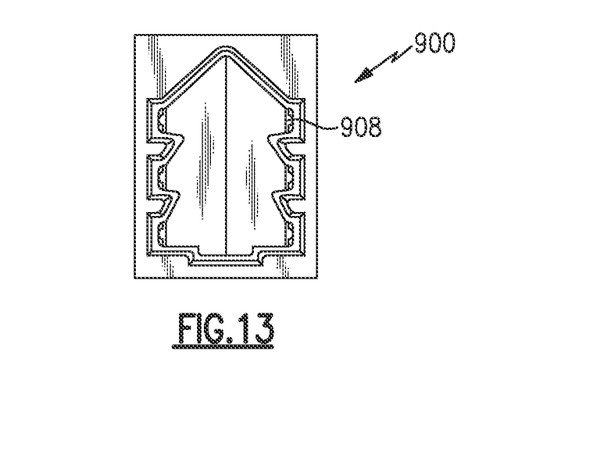
FIG. 13 is an illustration of the cutter shown in FIGS. 9-12 with a food product positioned therein.

FIG. 13 illustrates the mold shown in FIG. 11-12 having edible material within cavity 910 of cutter/mold 900. As can be seen, in portions of mold 900 wherein the cavity draft angle approaches 0, such as near sidewall portions 902, the edible material does not extend entirely to the cavity wall, thus leaving a gap 908.

In other embodiments, the edible material may extend to the wall of the cavity, but does not extend for the same vertical height along the wall of the cavity that it would extend if the cavity wall location included a steeper cavity draft angle. Or, the edible material may extend to the wall of the cavity, but the near vertical cavity draft angle may push-on or compact the edible material as the edible material is introduced into the cavity with lesser force than in cavity wall locations where the cavity draft angle is more angled. Consequently, in any of these embodiments, the edible material may engage or adhere less in the cavity wall location having the substantially vertical cavity draft angle and, release or ejection of the edible material from the cavity may be improved. Consistency of shape provided by molds/cutters 9-13 is also expected to be better than a cutter having a similar shape, but a uniform cavity draft angle and/or discontinuities in a sidewall thereof.

While not wishing to be bound by any theory, it is believed that ejection of the edible material from a cutter or mold having a varied cavity draft angle is improved relative to a cutter or mold having a uniform cavity draft angle due to this ability to direct the food product within the cutter or mold. That is, in a cutter or mold with a uniform cavity draft angle, the direction of motion of a food product being compressed thereby would not be controlled and the excess food product, wherever it may happened to occur, would be squeezed out of the mold or cutter. In the case of the present cutters or molds having a varied cavity draft angle, the motion of the food product is directed to areas where there is more room for the food product, and less of the food product is squeezed up against the sides of, or out of, the mold. As a result, the food product releases more easily from the present cutters or molds, having a varied cavity draft angle, than conventional cutters or molds wherein the cavity draft angle is uniform. Furthermore, by directing the motion of the food product to areas where there is more room because the cavity draft angle is lower, there is greater assurance that the food product will consistently fill the mold to create the desired shape.

Regardless of the shape, each cutter may include one or more edges that are adapted for cutting through a food product. The edges may be located at the outermost point or extremity of the cutter's side walls. In some examples, the edges are adapted for cutting through meat chunks, cereal grains, peanuts, caramel, nougat and other food products that typically form the inside of pet foods, and/or chocolate-covered candy bars. It should be understood however, that the final food product need not be subsequently covered in chocolate or any other food substance. In other examples, the edges are adapted for cutting through a food product that has already been covered with another food substance such as chocolate. In some embodiments, the cutter side walls are tapered to improve release of the product from the cutter.

In some examples, the edges of the cutter or mold may be beveled, meaning that the contacting face of the edges may not be perpendicular to the side walls of the cutter. This beveled shape of the cutter edge may also be referred to as the "grind" of the edge. The grind of an edge may refer to the cross-sectional shape of the edge, and a beveled edge may have a cross-sectional shape where the contacting face of the edge may not be perpendicular to the side walls of the cutter. For example, the contacting face of the edge may form a 45 degree angle relative to the line that extends outward from the side walls. Many other angles are possible.

In some examples, the edges may have a double (or triple, etc.) bevel, meaning that the edge may include two (or more) contacting surfaces that are angled differently from each other. For example, an edge may have a first bevel of approximately 15 degrees and a second bevel of approximately 20 degrees. The beveled edges of a cutter may adapt the cutter to cut through food products and/or recede from the food products more easily. Cutter 100, shown in FIG. 2 and FIG. 4 is shown having a single beveled cutting edge 112, while cutter 500, shown in FIGS. 6 and 8 is shown having a double beveled cutting edge 512.

Figure 14:
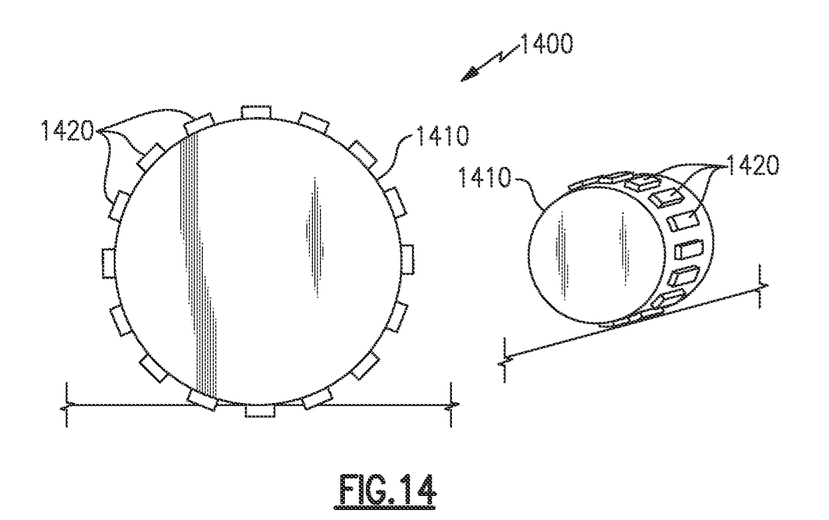
FIG. 14 is an illustration, in cross-sectional and perspective views, of a rotary cutting wheel incorporating the cutter shown in FIG. 5-6.

In some embodiments of the present disclosure, multiple cutters are disposed around the outer surface of a rotary wheel. FIG. 14 shows an illustration of an exemplary rotary cutting wheel 1400 according to some embodiments. Rotary cutting wheel 1400 includes rotary wheel 1410 that may resemble a rolling pin with cutters 1420 operatively disposed relative to the outer curved surface thereof. Rotary wheel 1410 has a cylindrical shape and is typically oriented such that the axis of the cylinder runs horizontally. The dimensions of rotary wheel 1410 are not critical and the circular cross-section of the cylinder may vary in radius, and the length of the axis of the cylinder may vary. Additionally, the ratio between the radius and the length of the axis may vary.

Cutters 1420 may either be attached to the outer curved surface such that they protrude outward beyond the curved surface of the rotary wheel, or they may be recessed into the rotary wheel such that each cutter 1420 extends minimally from the curved surface of the rotary wheel, or not at all. Further, although cutters 1420 are shown as being generally evenly spaced, this need not be the case, nor need cutters 1420 be the same shape.

In operation, as rotary wheel 1410 rotates about its axis, cutters 1420 approach the cutting surface of a food product, as may be provided to rotary cutting wheel 1400 by a conveying element (not shown in FIG. 14). Cutters 1420 thus make contact with the food product and then recede from the cutting surface, leaving behind the cut and formed food product on the cutting surface.

In some embodiments, cutters 1420 disposed around rotary wheel 1410, in addition to cutting the food product, may also mold the food product into a more desirable three dimensional shape. In some embodiments, the shapes can be curvilinear and thus create a shape with a plurality of rounded surfaces. For example, was mold 500, shown in FIG. 8, disposed on the outer surface of rotary wheel 1410, the surface of the food products produced by contact with rotary cutting wheel 1400 would have a rippled surface. In such embodiments, the edge of mold 500 will first contact the food strip; then walls 502*a*, 502*b*, 502*c* and 502*d* will contact the food strip, partially molding the food product; finally, contoured cavity 510 will contact the food strip, further molding or stamping the food product. The forces exerted on the food product by the varied cavity draft angles result in more consistent creation of the three dimensional shape including the contoured surface.

Figure 15:
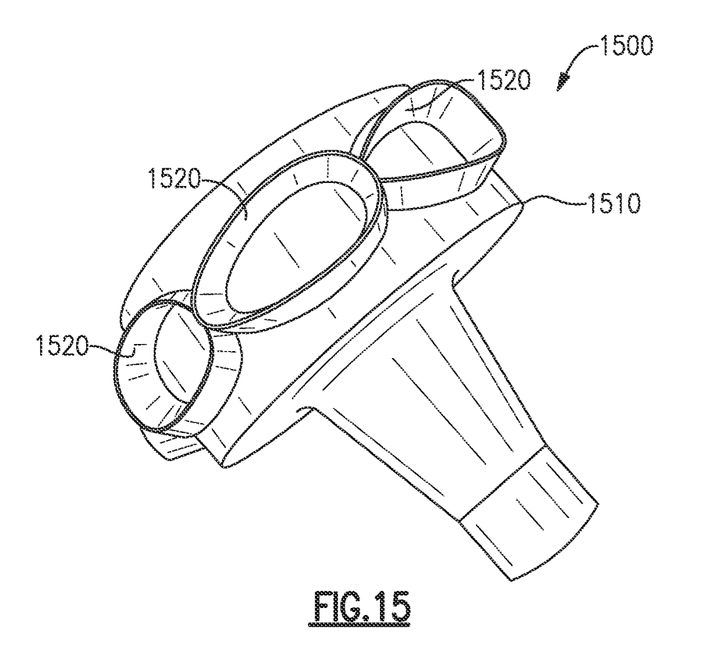
FIG. 15 is an illustration, in perspective view, of a rotary cutting wheel incorporating the mold shown in FIG. 3-4.

FIG. 15 shows another embodiment of a rotary cutting wheel 1500 including rotary wheel 1510 and a plurality of cutters 1520. In the embodiment shown, cutters 1520 are the same shape as those shown in FIGS. 1-4.

The rotary cutting wheel may be attached to an ultrasonic generator (also referred to as an ultrasonic frequency generator) that introduces ultrasonic vibrations to one or more parts of the rotary cutting wheel during operation of the system. In some embodiments, the ultrasonic generator and the rotary cutting wheel are configured in such a manner that only a portion of rotary cutting wheel vibrates, for example the cutters that are attached to the rotary cutting wheel, such that vibration does not translate to other parts of the apparatus. In other embodiments, the entire rotary cutting wheel may vibrate. It should be understood that throughout this disclosure, whenever reference is made to the vibration of the rotary cutting wheel, it is contemplated that either a part of the rotary cutting wheel may vibrate, or the entire wheel may vibrate.

The rotary cutting wheel may vibrate continuously at the same frequency and amplitude at all times during operation. For example, many rolling devices may operate at one constant frequency and amplitude because the machine is constantly feeding food product, the rollers are constantly rolling, and the cutters are cutting at an even rate. In other embodiments, however, the rotary cutting wheel may vibrate at different frequencies and different amplitudes during operation, depending on several factors.

The ultrasonic generator may operate (continuously or at a particular time) at a variety of frequencies and amplitudes. For example, the generator may vibrate (and causes the rotary cutting wheel to vibrate) at an ultrasonic frequency of about 15,000 Hz to 30,000 Hz. In one specific example, the generator vibrates at an ultrasonic frequency of approximately 20,000 Hz. In other embodiments, the ultrasonic frequency may be less than 30,000 Hz, or less than 25,000, or less than 20,000 while in still other embodiments, the ultrasonic frequency may be more than 15,000 Hz or more than 20,000 or more than 25,000 Hz. In some embodiments, the ultrasonic frequency may be between 20,000 and 25,000 Hz. Adjusting the frequency of the vibrations may allow a technician to adapt the system for ideal operation. For example, frequencies that are too low may cause the system operate too loudly because the vibrations resonate in an audible range. On the other hand, frequencies that are too high may cause the rotary cutting wheel and the cutters to vibrate so intensely that the cutters become unable to cut with ideal precision, and thus non-ideal cutter shapes would have to be used.

As far as the amplitude of the ultrasonic generator, in some examples, the generator may vibrate with amplitudes of between about 20 and 50 microns. In one specific example, the generator vibrates with an amplitude of between about 30 and 40 microns. In some embodiments, the generator may vibrate with amplitudes of more than 20, or more than 25, or more than 30, or more than 35, or more than 40, or more than 45 microns while in still other embodiments, the generator may vibrate with amplitudes of less than 50, or less than 45, or less than 40, or less than 35, or less than 30 or less than 25 microns. In some embodiments the generator may vibrate with amplitudes of between about 25 and 45 microns, Adjusting the amplitude of the vibrations may allow a technician to adapt the system for ideal operation. For example, if the generator vibrates with amplitudes that are too low, the food product may, to some extent, stick to the cutters or blades. On the other hand, if the generator vibrates with amplitudes that are too high, the cutters and blades may get too hot which may result in the food product melting to some extent.

The ultrasonic generator may be comprised of an input converter and a transducer. The input converter converts an electrical input (for example, 60 HzAC, 117 VAC, or 240 VAC) to electrical pulses. The transducer then converts the electrical pulses received from the input converter to mechanical vibrations which are then introduced to the rotary cutting wheel. In one embodiment of the present disclosure, the input converter converts an electrical input to about 20,000 electrical pulses, which the transducer then converts to about 20,000 mechanical vibrations per second. Various other types of equipment can be used in connection with (or as part of) the ultrasonic generator, such as, for example, a booster or reducer that can effectively increase or decrease the vibratory movement of the cutters, as desired.

The rotary wheel and associated cutters benefit from the ultrasonic vibrations in several ways. For example, the ultrasonic vibrations cause a reduction in the friction at the surfaces of the cutters, such as the cutting edges, the walls adjacent to the cutting edges and the contoured cavities (optional) of the cutters. Surfaces with reduced friction are less prone to sticking to food product. Additionally, because the cutters of the rotary cutting wheel can cut without sticking to the food product, the apparatus may operate for longer periods of time before it needs to be stopped so that the cutters may be cleaned or replaced.

The surfaces of the cutters, such as the cutting edges, the walls adjacent to the cutting edges and the contoured cavities may be formed out of a variety of materials. Ultrasonic vibrations have been shown to reduce the friction properties of metal surfaces, as well as plastic surfaces, and thus, metal or plastic surfaces may be used, for example. It may be possible to further improve the friction properties of the surfaces of the cutters by adding or coating one or more of the surfaces with a lubricious polymeric material. For example, the surfaces may be coated with a lubricious polymeric material such as polytetrafluoroethylene (sold commercially under the trademark TEFLON), which can be bonded to the surfaces of the cavities. Alternatively, the surfaces can be fabricated from a polymeric material that provides lubricious properties.

Another benefit of the ultrasonic vibrations is that the edges of the cutters cut more cleaning through the food product. For example, an ultrasonically vibrated cutting edge can make very clean cuts through peanuts, such that the peanuts are left with smooth edges. By contrast, when peanuts are cut with a regular knife or edge, the resulting peanuts may have jagged or crumbled edges.

Additionally, ultrasonic vibrations may help mix the food product, or maintain the food product in a well-mixed state. Ultrasonic vibrations have been used in processing of liquids and semi-liquids, by generating alternating low-pressure and high-pressure waves in liquids, leading to the formation and violent collapse of small vacuum bubbles. This phenomenon (sometimes termed "cavitation") causes high speed impinging liquid jets and strong hydrodynamic shear-forces that can be used for the disintegration of cells and mixing. It should be understood that some food products maintain a fairly constant consistency and, therefore, do not require mixing during the cutting and forming of the food strips. However, the mixing benefits of ultrasonic vibrations may be useful to maintain the consistence or further mix some types of food products.

Figure 16:
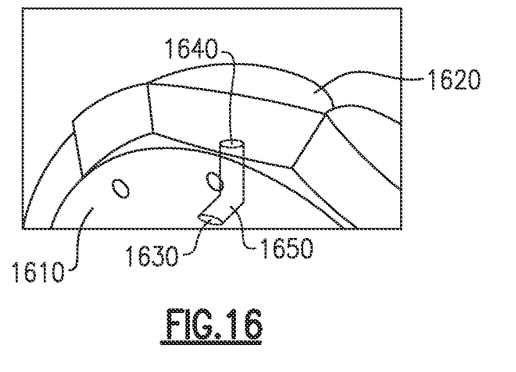
FIG. 16 is an illustration of a portion of the rotary cutting wheel shown in FIG. 15, showing a cutter vent and rotary cutting wheel vent, connected.

In some embodiments, the rotary cutting wheel may also be vented. Such an embodiment is shown in FIG. 16. As shown in FIG. 16, the rotary wheel 1610 has holes or ventilation channels 1630 that are bored or drilled substantially horizontally into rotary wheel 1610. Additionally, ventilation channels 1640 are bored or drilled from the base of cutter 1620's cavities and run toward the center of the rotary wheel 1610 where they eventually intersect with the ventilation channels 1630 to form a continuous ventilation channel 1650. As such, air can flow to and from the base of the cavity of cutter 1620 from and to the exterior space surrounding rotary cutting wheel 1610, thereby venting the cavity of cutter 1620 while food products are being formed thereby. Ventilation can assist in reducing, or even preventing, the establishment of a vacuum within the cavity of cutter 1620 which may make food product pieces stick and not release easily.

In some embodiments, the ventilation channels can the take the form of areas of discontinuity in the cutting edge of the cutters. In these embodiments, the areas of discontinuity can occur wherever the cutter runs parallel to the edge of the product strip. In some embodiments, the areas of discontinuity can be a single opening in the edge of the cutter while in other embodiments, there can be an area of discontinuity at every point where the cutter is parallel to the product strip. By placing the area(s) of discontinuity at point(s) where the cutting edge of the cutter runs parallel to the product strip, the shape of the formed product is not comprised.

In some embodiments, the size of the area(s) of discontinuity is at least 1.5 mm while in other embodiments the size can be less than 50 mm. In embodiments where the size of the area(s) of discontinuity is smaller, the taper of the cutter side wall may be decreased to improve release of the product from the cutter.

In yet other embodiments, the ventilation channels may be coupled to an air or gas source (not shown) that creates an air or gas pulse to positively pressurize the cavity to facilitate the ejection of food product pieces from the cavity. In such embodiments, ventilation channels 1650 may be routed and adapted to allow a gas, for example a pressurized gas, to flow between the gas source and the base and/or cavity of the cutters 1620, to aid in ejection of the food product.

The air or gas source (not shown) may be in communication with one or more sensors (not shown), for example, optical sensors such as cameras. The sensors may be oriented and adapted to detect whether a food product has been properly ejected from the cavity of the cutters. The sensor may communicate a signal to the air or gas source when the sensor detects that a food product has not been properly ejected from a cavity, and, in response to the signal from the sensor, the air or gas source may generate a blast or pulse of air or gas through one or more of the ventilation channels, to aid in ejecting the food product. The sensors may aid a food manufacturer in lowering production costs because the air or gas source may only need to expend energy to blast air when a food product does not eject on its own.

It is to be understood that the disclosed varied cavity draft angle provides similar advantages as those that may be provided by ventilation channels 1650, or discontinuities in the sidewalls of the cutters or molds. And so, while ventilation channels and/or discontinuities may be used with the disclosed varied cavity draft angle in the cutter or rotary cutting wheels disclosed herein, in some embodiments of the invention, neither ventilation channels nor discontinuities in the mold or cutter sidewalls are present. Surprisingly, in such embodiments similar, or even enhanced, release can be seen of food products, and in particular sticky food products or food products comprising layers or sections of sticky material, from the cutters or molds, as compared to cutters having either or both ventilation channels or discontinuities. Cutters or molds without ventilation channels or discontinuities may also be easier to clean or experience fewer clogging issues than cutters or molds comprising either or both of these. And, cutters or mold without ventilation channels or discontinuities may more consistently form desired shapes.

Figure 17:
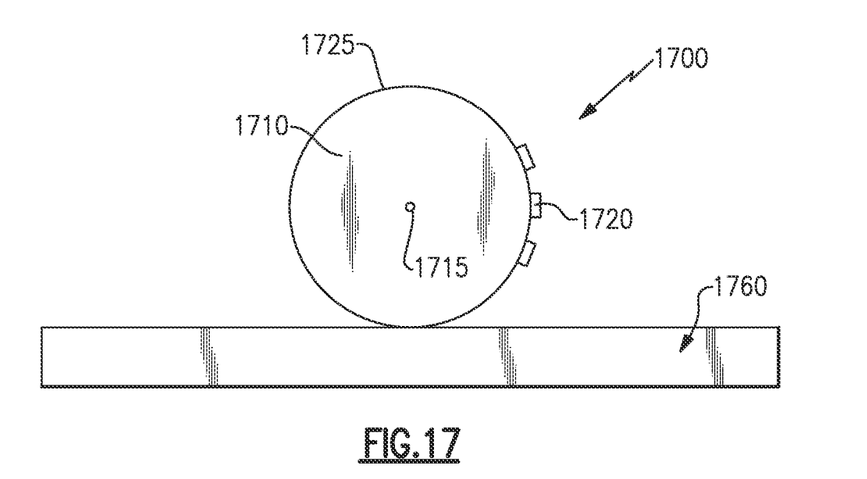
FIG. 17 is an illustration, in cross-sectional view, of a system according to one embodiment.

FIG. 17 shows an illustration of one embodiment of a system 1700 incorporating a rotary cutting wheel 1725. As shown, system 1700 includes rotary cutting wheel 1725, having a plurality of cutters 1720 disposed on the outer surface of rotary wheel 1710. Rotary cutting wheel 1725 is operatively disposed relative to conveying element 1760 that may convey a food product to be formed to rotary cutting wheel 1725. In operation of system 1700, as rotary cutting wheel 1725 rotates about axis 1715, cutters 1720 approach the cutting surface of conveying element 1760, making contact with a food product conveyed thereon (not shown), and then rotating away from the surface of conveying element 1760, leaving behind the cut and formed food product on conveying element 1760.

Figure 18:
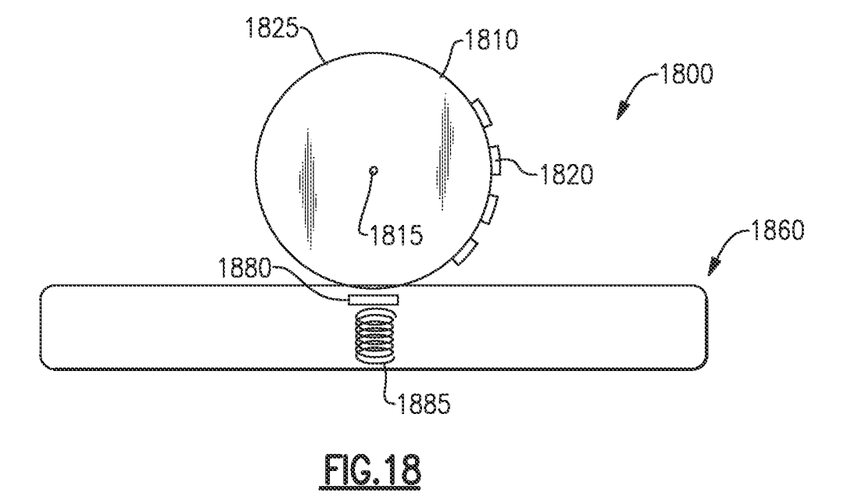
FIG. 18 is an illustration, in cross-sectional view, of a system according to another embodiment.

Another embodiment of the system is shown in FIG. 18. System 1800 includes rotary cutting wheel 1825 and conveying element 1860. In the embodiment shown in FIG. 18, conveying element 1860 incorporates therein movable backing plate 1880. Movable backing plate 1880 may advantageously be disposed under conveying element 1860 at the point where cutters 1820 of rotary cutting wheel 1825 contact the food product (not shown) conveyed on conveying element 1860. This point of contact can be the point where the food product passes beneath the approximate center of mass of rotary cutting wheel 1825, which may be coincident with rotary cutting wheels axis 1815.

As shown, movable backing plate 1880 is operatively disposed relative to spring 1885. Spring 1885 causes movable backing plate 1880 to exert force upward against conveying element 1860, and in turn against the food product (not shown) being conveyed on conveying element 1860. Additionally, in some embodiments, rotary cutting wheel 1825 may be adjustable vertically so that the distance and/or pressure between rotary cutting wheel 1825, conveying element 1860 and backing plate 1880 may change as rotary cutting wheel 1825 is adjusted. For example, rotary cutting wheel 1825 may be adjusted by a screw gear (not shown).

One object of the movable backing plate is to compensate for the effect of ultrasonic vibrations on the conveyor belt (from the cutting element). In order for the rotary cutting wheel to cut through the food product strips, pressure must be exerted downward on the food product, and thus, the cutting edges of the cutters also exert pressure downward upon the belt. The movable backing plate is adapted to absorb some of the pressure that is exerted down on the belt from the cutters, which reduces the amount of damage caused by the cutters on the belt. Therefore, the movable backing plate allows for long term operation of the ultrasonic rotary cutting wheel system with reduced cutting or wearing of the conveyor belt. Additionally, the movable backing plate evens out the pressure exerted on the belt which allows for more consistent cutting.

Another benefit of the movable backing plate may be that it minimizes or prevents completely any leaking of food product from the cutters of the rotary cutting wheel. The movable backing plate in conjunction with a semi-flexible conveyor belt may allow for evenly-spaced contact between the edges of the cutter and the belt, thereby allowing the cutters to cut completely through the food product strips, making clean cuts with minimal or no leakage of food product from between the cutting edge of the cutter and the conveyor belt.

Spring 1885 is shown as a coiled spring, whereas more force is exerted downward thereupon, spring 1885 compresses in a vertical direction and exerts more force upward against backing plate 1880. In other embodiments, such as that shown in FIG. 19, spring 1985 may be designed to include a flexible fin 1986 or paddle attached to a rod 1987 where as more force is exerted down on the top surface of fin 1986, especially near the outer end of the fin, the fin wraps slightly more around the rod 1987 and exerts more force in the opposite rotation direction, generally upward against the backing plate (not shown in FIG. 19).

The spring (e.g., spring 1885 and/or spring 1985) may be adapted to have an adjustable spring tension so that the spring and the backing plate may exert a range of forces, depending on the desired application. For example, the spring tension system may be adjusted so that the spring exerts a pressure that may range from zero pounds to approximately 50 pounds of force. In some embodiments, the spring pressure may be more than 10, more than 20, more than 30, or more than 40 pounds of force while in other embodiments, the spring pressure may be less than 50, or less than 40 or less than 35, or less than 30 or less than 25 or less than 20 or less than 15 or less and 10 pounds of force. In another example, the spring operates within a range of forces between approximately 10 pounds and 20 pounds. In some embodiments, the spring may exert a pressure of from about 5 to about 45 pounds of force while in other embodiments, the pressure may be from about 15 to about 35 pounds of force. The spring tension may be adjusted in a variety of manners. For example, spring may simply be replaced with a different spring with different resistance properties. In another example, a coiled spring may include a dial that can increase the resistance of the spring. In yet another example, the resistance of a fin-styled spring may be increased by rotating the rod so that the fin rests in a more torqued initial position when no food product is on the backing plate.

Figure 20:
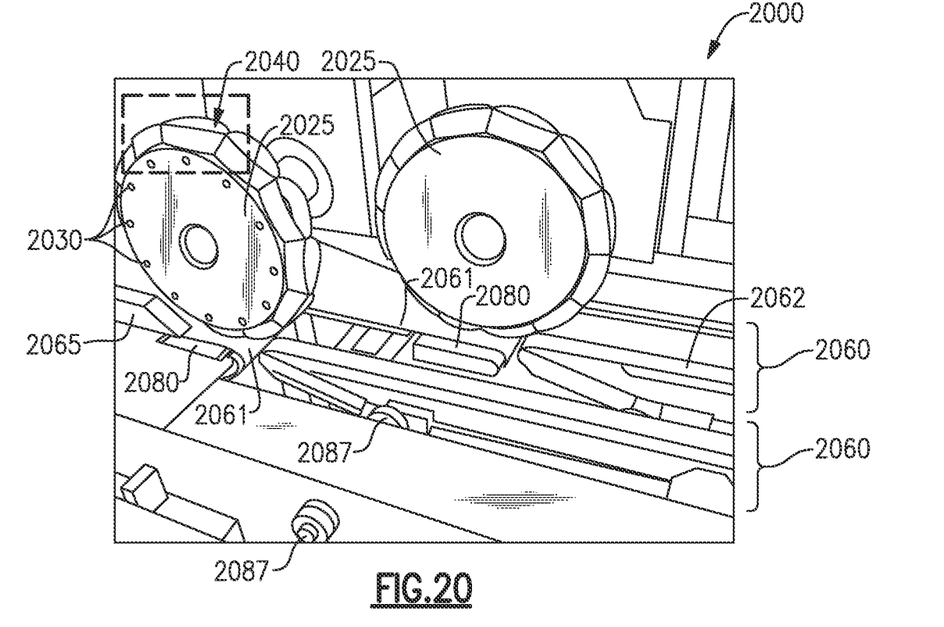
FIG. 20 is an illustration of a system according to another embodiment.
Figure 21:
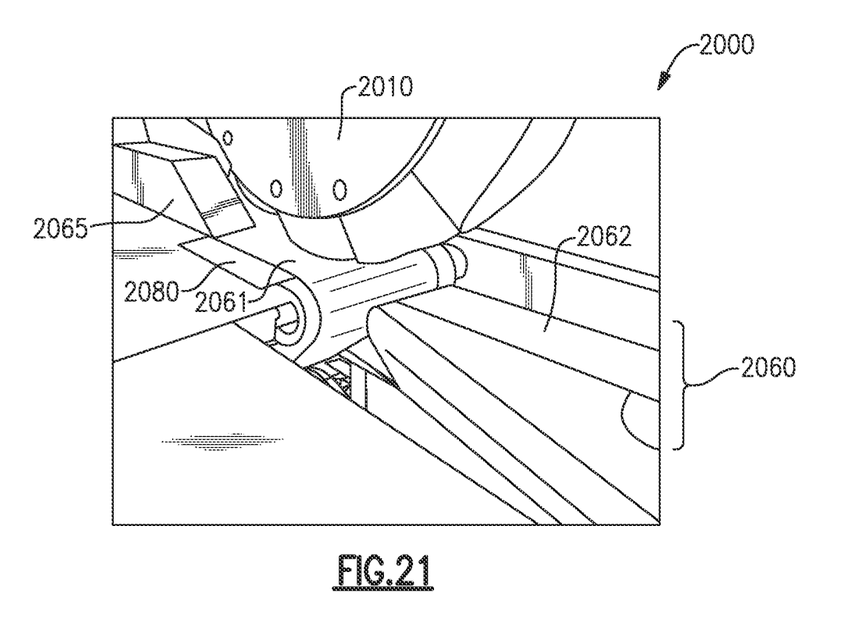
FIG. 21 is a close-up illustration of the system shown in FIG. 20.

FIGS. 20 and 21 show yet another embodiment of a system provided herein. As shown in FIGS. 20 and 21, system 2000 includes two rotary cutting wheels 2025, two moveable backing plates 2080 and two conveying elements 2060, although the present system is not so limited and may include any number of rotary cutting wheels, movable backing plates and conveying elements.

FIG. 20 shows two embodiments of rotary cutting wheel 2025, one including ventilation channels 2030 and one without. A dual conveyor belt embodiment is also shown in FIG. 20, and more closely in FIG. 21. In these embodiments, conveying elements 2060 each include two conveyor belts, each conveyor belt being independently powered, for example, with independent rollers, gears, gear belts, motors and/or the like. In operation, a food product (not shown) along left conveyor belt 2061 and then gets formed by rotary cutting wheel 2200, while generally positioned above movable backing plate 2080. The formed food product (not shown) transfers to right conveyor belt 2062.

Conveying element may include one or more side-rail guides, and such an embodiment is shown in FIGS. 20 and 21, wherein conveying elements 2060 include side-rail guides 2065. For example, each lane of conveyor belts may include a side rail guide on either or each side of the lane. For each lane, the side rail guides may extend the entire length of the conveying element or a portion of the length of the conveying element. For example, the side rail guides may extend along portions of the conveying element that lead into and out from the rotary cutting wheel. The side rail guides may be positioned and adapted aid a food product traveling on a conveyor belt from straying. For example, side rail guides that extend along portions of the conveying element that lead into the rotary cutting wheel may aid strips of food product from straying and/or falling off of the conveyor belt. As another example, side rail guides that extend along portions of the conveying element that lead out from the rotary cutting wheel may aid molded pieces of food product from straying and/or falling off of the conveyor belt.

Optional support platforms (not shown) may also be used to supply a sturdy surface below conveyor belts 2061 and 2062, if needed. For example, a sturdy surface may be required when a piece of machinery must apply force downward upon a food product that is moving on the conveyor belt. In other embodiments, conveying elements 2060 may include a series of rollers, a series of discrete conveyor belts, or other means of conveying a food product along a feed path. (The path that a food product travels, along the top of the conveying element, from its form as a strip, through the rotary cutting wheel, and beyond, is sometimes referred to as the "feed path.")

Figure 19:
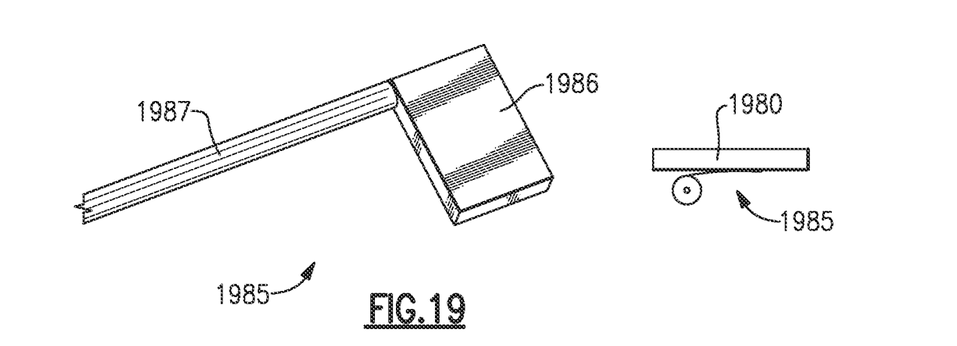
FIG. 19 is an illustration of another embodiment of a spring that may be provided in conjunction with a backing plate.

FIGS. 20 and 21 also show another embodiment of the movable backing plate shown in FIG. 19. As shown in FIGS. 20 and 21 movable backing plates 2080 are located beneath conveyor belts 2061 and below rotary cutting wheels 2025. Rod 2087 may run through one or more solid pieces of system 2000 or solid pieces of nearby machinery such that the rod 2087 is coupled to a solid base so that it can resist rotation as the fin (not shown) torques rod 2087. Rod 2087 then connects with a fin (not shown) that is located beneath the backing plate 2080. In another example, the fin may be adhered to the backing plate 2080 or the fin may be formed with the backing plate 2080 so that they constitute a single molded piece.

Figure 22:
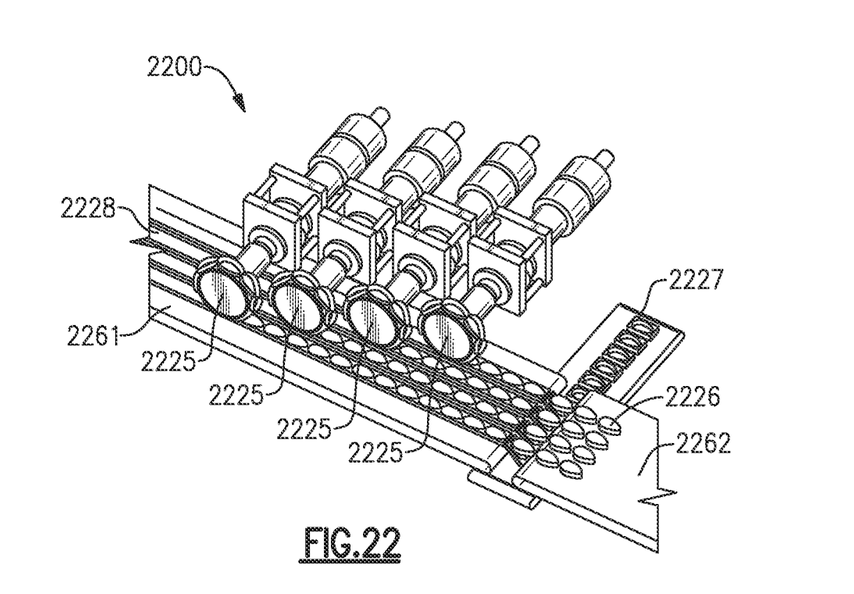
FIG. 22 is an angled-top-view illustration of a system according to another embodiment

Another dual conveyor belt embodiment can be seen in FIG. 22. In operation of system 2200, food products 2226 travel from left to right (as the figure is depicted). As the food products 2226 transfer from left conveyor belt 2261 to right conveyor belt 2262, "webbing" (or the excess food product) 2227, that is created when the rotary cutting wheels 2225 stamp food product strips 2228, falls between left and right conveyor belts 2261 and 2262, where it is then carried away. Removal of webbing 2227 may help to ensure that scrap food product does not re-adhere to food products 2226 after formation. In some embodiments, the right conveyor belt 2262 may be run at a higher speed than left conveyor belt 2261. This difference in speed between belt 2261 and belt 2262 may create a gap between successive formed food pieces 2226 so that they do not stick to each other after they are formed.

The ultrasonic rotary molding system may utilize a single lane of conveyor belts, or it may utilize multiple lanes of individual conveyor belts. The difference in these two embodiments can be seen, for example, if FIG. 20 and FIG. 22 are compared. In FIG. 20, multiple separate lanes are used, one lane per rotary cutting wheel. By contrast, in FIG. 22, a single conveyor belt lane is used, even though the system includes multiple rotary cutting wheels 2225. Utilizing multiple strips of food product and/or multiple separate conveyor belts may provide benefits while forming food products. For example, separate strips of food product allows for the system to employ multiple staggered wheels, and multiple separate conveyor belts with widths that are narrower than the widest width of the cutters may facilitate the webbing or scrap food product to fall away from the formed food product quickly, sometimes immediately after forming. Quick removal of the webbing or trim may help to ensuring that scrap food product does not re-adhere to the formed food product after it is formed and cut by the rotary cutting wheel.

The conveyor belt's outer surface may have a variety of textures (or lack thereof). In one embodiment, the outer surface is a very smooth surface. A smooth outer surface may be beneficial because it may allow for superior adhesion between the outer belt surface and the food product because a smooth surface allows for more surface area contact between the belt and the food product. Better adhesion facilitates the belt to pull the food product from the cutters after they have completed cutting and forming the food product. Additionally, better adhesion prevents the food product from slipping and moving backwards along the conveyor belt as the food product is fed into the rotary cutting wheel as well as other stages in the system that may require that a machine part touch the food product. In a specific example of this embodiment, the conveyor belt may include an FDA-approved smooth surface that is safe to contact the food products and a belt that is partially or wholly constructed of fabric and is adapted to withstand bending and turning around sharp corners, curves and the like. Other embodiments of the present disclosure may include conveyor belts with outer types of surfaces that are not perfectly smooth and/or are textured because some types of food products may stick better to textured surfaces.

Figure 23:
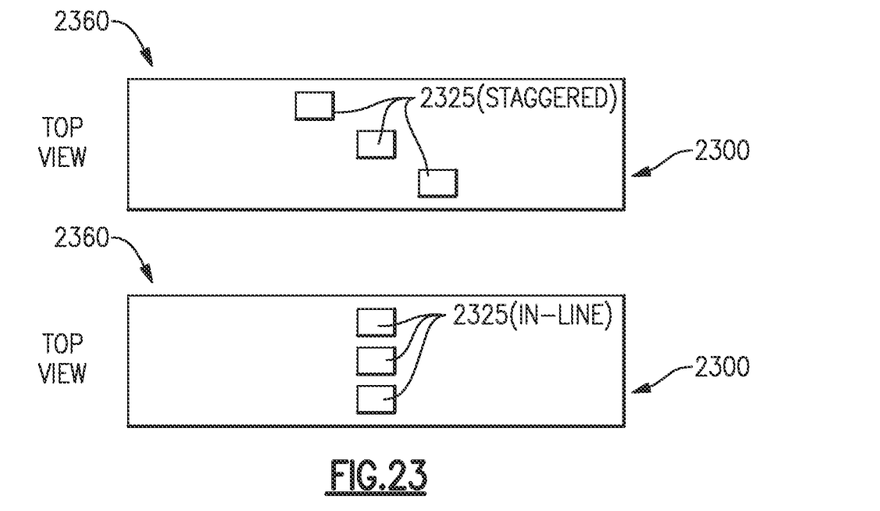
FIG. 23 is two top-plan-view illustrations of systems according to one or more embodiments.
Figure 24:
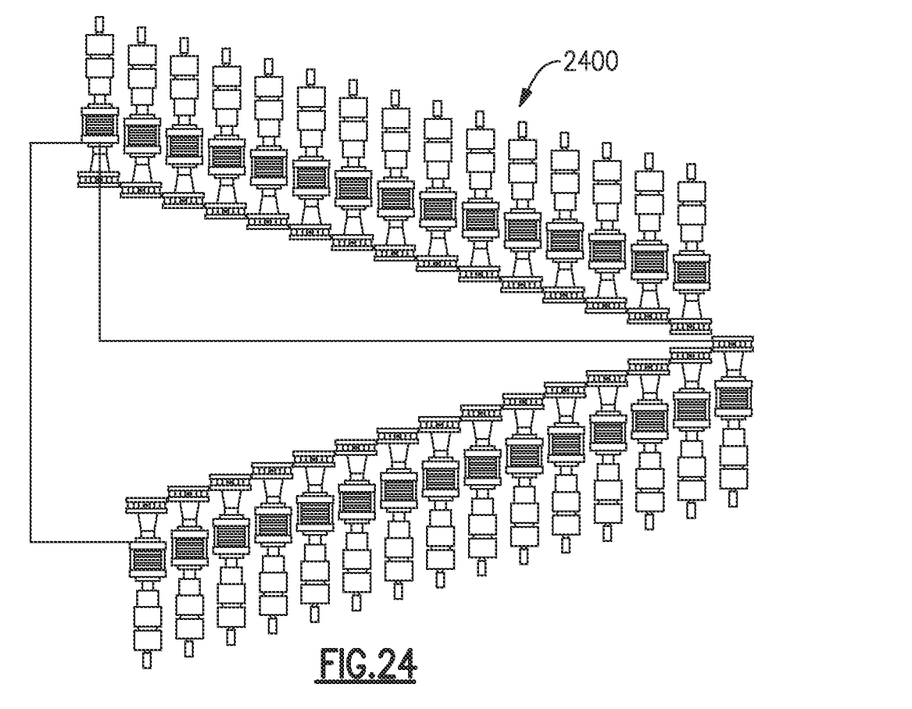
FIG. 24 is a top-plan-view illustration of a system according to another embodiment.

In systems wherein more than one rotary cutting wheel is used, the rotary cutting wheels may be arranged in any suitable or convenient manner. In some embodiments of the system, the rotary cutting wheels may be staggered, as is shown in FIGS. 20, 22 and 23. As can be seen from these figures, the system may be configured to accommodate a wide range of numbers and orientations of rotary cutting wheels, from a single rotary cutting wheel (FIGS. 17 and 18), to two rotary cutting wheels (FIGS. 20 and 21), to four rotary cutting wheels (FIG. 22), to 30 rotary cutting wheels as shown in the example of FIG. 23. More specifically, FIG. 23 shows an example of how a system 2300 may be scaled up to include many rotary cutting wheels while keeping the footprint of the overall system manageable. For example, a 'V' configuration, as shown in FIG. 23, is one example of a system with a manageable footprint.

Even though FIGS. 20, 22, 23 and 24 may show the system as including staggered rotary cutting wheels, it should be understood that the rotary cutting wheels may be oriented such that at least one rotary cutting wheel in the system is oriented in-line with another rotary cutting wheel, such that the axis of at least one rotary cutting wheel approximately aligns with the axis of another rotary cutting wheel in the system. FIG. 23 also provides an illustration of such a system (the figure on the bottom) for an example of a fully in-line system 2300.

Figure 25:
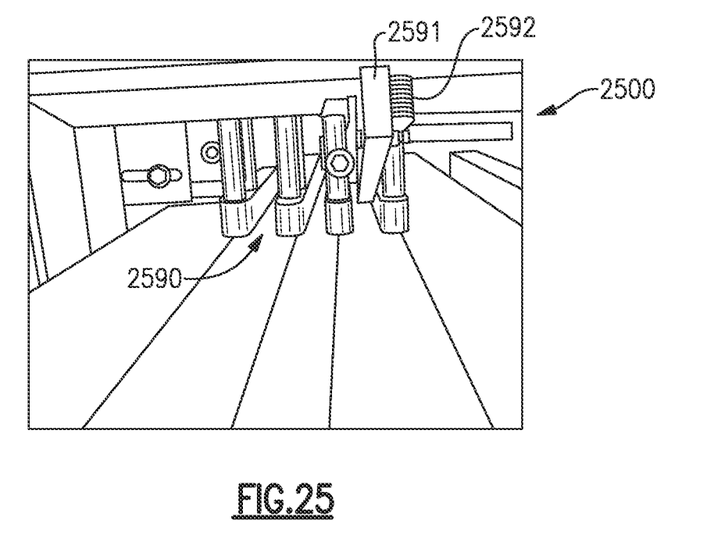
FIG. 25 is an illustration of an infeed stage as may be included in some embodiments of the system.

In some embodiments of the present disclosure, the system may further include an infeed stage 2500, as shown in FIG. 25. In the embodiment shown, infeed stage 2500 includes a lift prevention mechanism in the form of one or more pressure fingers 2591, where each pressure finger applies a downward force to the food products that are moving along the conveyor belt toward the rotary cutting wheel, for example, to ensure that the food products are well adhered to the conveyor belt before they reach the rotary cutting wheel. In FIG. 25, infeed stage 2500 has one pressure finger 2591 and one lane without a pressure finger 2590. In some embodiments, a single lane of the infeed stage may include more than one pressure finger, for example, two or more pressure fingers in series. In these embodiments, multiple pressure fingers may engage a single strip of food product, for example to ensure that the food product is well adhered to the conveyor belt. The infeed stage 2500 is typically located upstream (in the feed path) from the rotary cutting wheel(s), for example, at distance upstream such that the tip of a pressure finger is approximately 1 to 2 inches away from the point where the rotary cutting wheel contacts the food product. Pressure finger 2591 may be spring loaded whereby spring 2592 forces the tip of the finger in a downward direction. Different springs may be used so that the pressure finger may exert different downward forces, for example, between 10 and 15 pounds. The spring may attach to the pressure finger at varying locations along the finger. Pressure finger 2591 may be formed from a variety of materials, for example, plastic.

In some embodiments of the system that include an infeed stage 2500 and a lane without a pressure finger 2590, the food product may not sufficiently adhered to the conveyor belt, and therefore, the food product may slip or slide backwards along the conveyor belt when the rotary cutting wheel touches the food product. If food products slip backwards, the food products may back up, and the system may have to be shut down and cleaned out. In order to address this problem, pressure finger 2591 may exert pressure down on the food product to better adhere it to the conveyor belt so that the food products do not slip. One benefit of a system where the food products do not slip is that the system may be adapted for continuous and efficient operation. A benefit of a system where the cutters include varying cavity draft angles, the pressure exerted by pressure finger 2591 can be lower as there will be less of a tendency for the food product to slip or slide backwards. Therefore, in some embodiments, the spring used to create the downward force may be between 10 and 12 pounds.

The infeed stage may include one or more side rail guides (not shown in FIG. 25). For example, side rail guides that extend along portions of the conveying element that lead into the rotary cutting wheel may aid strips of food product from straying and/or falling off of the conveyor belt. Side rail guides may keep the food product approximately centered on a conveyor belt while the food product is contacted by one or more pressure fingers and/or a rotary cutting wheel.

In some embodiments of the present disclosure, the system further comprises a sheet forming device that is located upstream (in the feed path) from the rotary cutting wheel. The sheet forming device forms an edible composition into a product sheet upstream.

In some embodiment of the present disclosure, the system further comprises a slitting device that is located upstream (in the feed path) from the rotary cutting wheel. The slitting device divides product sheets into a plurality of product strips prior to the strips being fed to the rotary cutting wheel.

A method for forming a confectionery, or other food product, is also provided and comprises: (1) forming one or more confectionery product strips; (2) moving the confectionery product strips along a feed path that may include a conveyor belt; and (3) cutting the confectionery product strips into a plurality of confectionery product shapes by contacting the confectionery strips with a rotary cutting wheel.

Forming the confectionery product strip may further include the steps of forming a confectionery sheet and slitting the sheet into strips. Moving the product strips may also include moving product strips through an infeed stage, whereby a pressure finger applies downward pressure to the product strips to adhere them to the conveyor belt. Cutting the strips may include a plurality of cutters that contact the confectionary strips at a point where the confectionery strips pass beneath the approximate center of mass of the rotary cutting wheel(s). At the point where the rotary cutting wheel(s) contact(s) the confectionary strip, a moveable backing plate may be positioned beneath a conveyor belt to allow for absorption of some of the pressure that the rotary cutting wheel exerts down on the confectionary strip and the conveyor belt. The movable backing plate may be spring loaded.

In one embodiment of the methods, once the product shapes are formed by cutting, a coating layer may be applied to one or more of the product shapes. Additionally or alternatively, one or more of the product shapes may be subjected to a surface treatment. In one embodiment these one or both steps may be downstream from the rotary cutting wheel. For example, after forming the food product forms may be enrobed, coated by tumbling as in the case of a panning operation or otherwise surface treated by spraying.

The solutions described in present disclosure may provide several benefits. Previous styles of food cutters have disadvantages, and the solutions of the present disclosure either do not experience these disadvantages or they experience them to a lesser degree. For example, guillotine-style cutters can utilize only generally straight blades, so the guillotine cutter can only cut food products into final shapes that have linear and angular edges. One benefit of some embodiments described herein is that the tools that are attached to the rotary cutting wheel are not limited to having only straight and angular edges, and therefore, the rotary cutting wheel may produce final food products that have a variety of shapes including circles, ovals, egg-shapes, animal shapes and more. Moreover, because the tool that cuts the strips of food product may also contain a three dimensionally formed cavity, some embodiments described herein may cut and three dimensionally shape a final food product all in one step. This three dimensional shaping was not possible with previous styles of guillotine cutters. And, by virtue of providing the cutters with a varied cavity draft angle, the cutters disclosed herein may exhibit better food release properties, in particular when used to cut sticky food products, or food products comprising layers of sticky materials, than not only guillotine style cutters, but even other cutters capable of forming more complex shapes, but having a uniform cavity draft angle.

One additional benefit of the system as described in one or more embodiments of the present disclosure is that the rotary cutting wheel design allows for compositional consistency between different "forms" of the same type of food product—a consistency that may not be possible with other formation methods. For example, the system may provide compositional consistency between the confection known as a Snickers® bar and the confection known as a Snickers® egg, by cutting the formed product into the desired shape, rather than forming the food product in the mold or cutter. Forming the food product directly in each mold or cutter can result in different amounts of each layer being deposited, so that the resulting food product does not have the same ratio of, e.g., chocolate to nougat to caramel to peanuts, as other food products produced at the same time, and on the same equipment.

While the present solutions have been described and illustrated by reference to particular embodiments, it will be appreciated by those of ordinary skill in the art that the solutions lend themselves to many different variations not described or illustrated herein.

The invention claimed is:

1. A cutter for a food product having at least one sidewall defining a cavity, the cavity comprising a cutting edge and a base edge, the sidewall comprising:
    a first sidewall section, wherein the thickness of the first sidewall section increases from the cutting edge to the base edge forming a first cavity draft angle;
    a second sidewall section, wherein the thickness of the second sidewall section is substantially the same from the cutting edge to the base edge forming a second cavity draft angle,
    sidewall segments on opposite sides of an axis of symmetry having approximately the same cavity draft angle; and
    sidewall segments on opposite sides of an axis perpendicular to an axis of symmetry having approximately the same cavity draft angle;
    wherein the sidewall segments on the opposite sides of the axis of symmetry have the first cavity draft angle and sidewall segments on the opposite sides of the axis perpendicular to the axis of symmetry have the second cavity draft angle;
    wherein the first and second cavity draft angles are different.

2. The cutter of claim 1, wherein the cutter further comprises a base defining a bottom of the cavity, wherein the base is optionally contoured or patterned.

3. The cutter of claim 1, wherein the first cavity draft angle is from 1 to 10 degrees.

4. The cutter of claim 3, wherein the second cavity draft angle approaches 0 at least one point, or along a length, of the sidewall.

5. The cutter of claim 1, wherein the cavity is vented via the provision of discontinuities in the sidewall.

6. A rotary cutting wheel for a food product comprising one or more cutters, the cutter having at least one sidewall defining a cavity, the cavity comprising a cutting edge and a base edge, the sidewall comprising:
    a first sidewall section, wherein the thickness of the first sidewall section increases from the cutting edge to the base edge forming a first cavity draft angle; and
    a second sidewall section, wherein the thickness of the second sidewall section is substantially the same from the cutting edge to the base edge forming a second cavity draft angle,
    sidewall segments on opposite sides of an axis of symmetry having approximately the same cavity draft angle; and
    sidewall segments on opposite sides of an axis perpendicular to an axis of symmetry having approximately the same cavity draft angle;
    wherein the sidewall segments on the opposite sides of the axis of symmetry have the first cavity draft angle and sidewall segments on the opposite sides of the axis perpendicular to the axis of symmetry have the second cavity draft angle;
    wherein the first and second cavity draft angles are different.

7. The rotary cutting wheel of claim 6, wherein the cutter further comprises a contoured or patterned base defining a bottom of the cavity, wherein the base is provided by a surface of the rotary cutting wheel.

8. The rotary cutting wheel of claim 6, wherein all of the cutters have a varied cavity draft angle.

9. The rotary cutting wheel of claim 6, wherein the cutter is ultrasonically activated.

10. The rotary cutting wheel of claim 9, wherein at least one cutter comprises a vented cavity, the rotary cutting wheel is also vented and the cavity vent and the rotary cutting wheel vent are connected.

11. A cutter for a food product having at least one sidewall defining a cavity, the cavity comprising a cutting edge and a base edge, the sidewall comprising:
    a first sidewall section having a first base edge thickness; and
    a second sidewall section having a second base edge thickness,
    wherein the first base edge thickness is greater than the second base edge thickness;
    sidewall segments on opposite sides of an axis of symmetry having approximately the same cavity draft angle; and
    sidewall segments on opposite sides of an axis perpendicular to an axis of symmetry having approximately the same cavity draft angle;
    wherein the sidewall segments on the opposite sides of the axis of symmetry have a first cavity draft angle and sidewall segments on the opposite sides of the axis perpendicular to the axis of symmetry have a second cavity draft angle;
    wherein the first and second cavity draft angles are different.

* * * * *